UNITED STATES PATENT OFFICE.

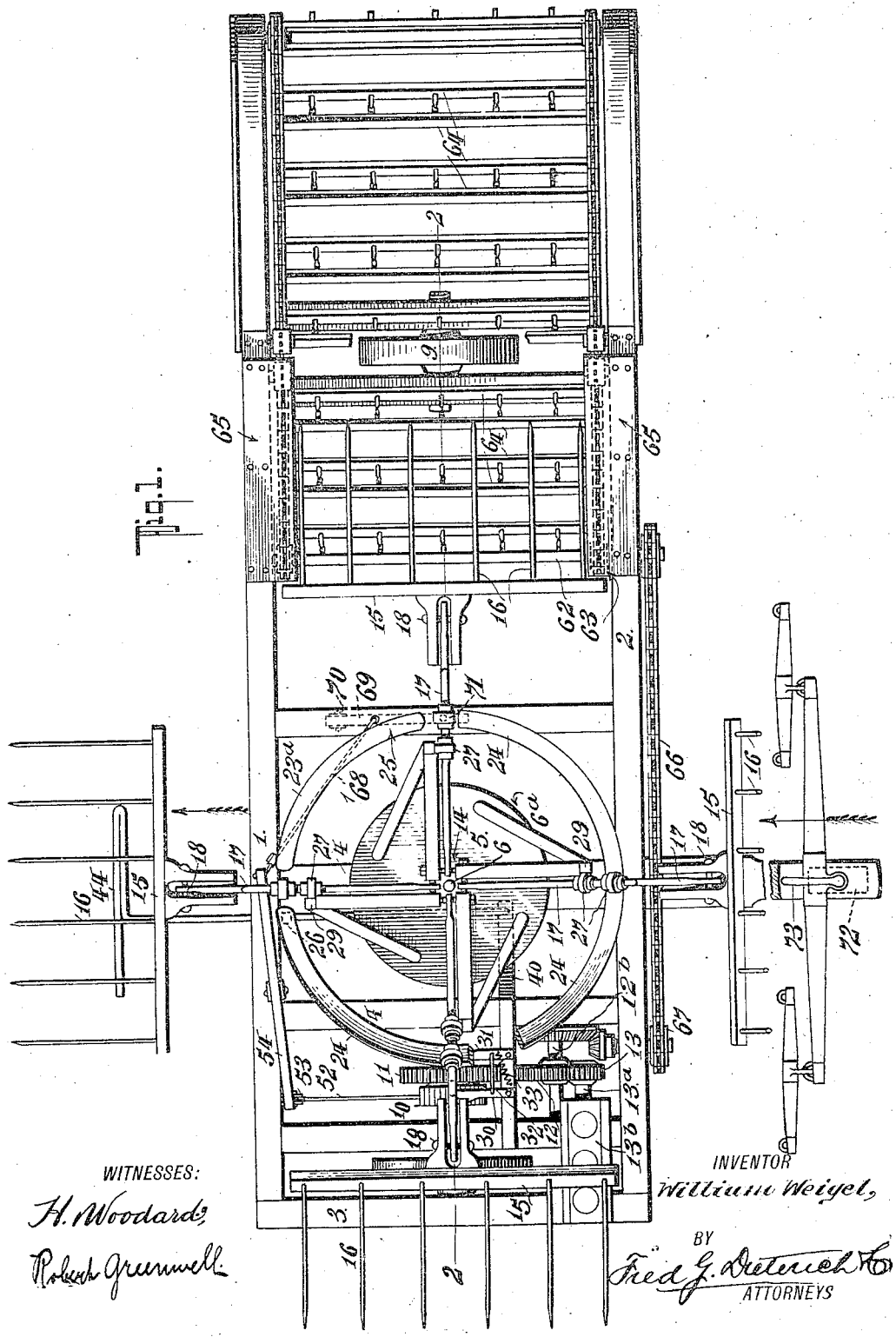

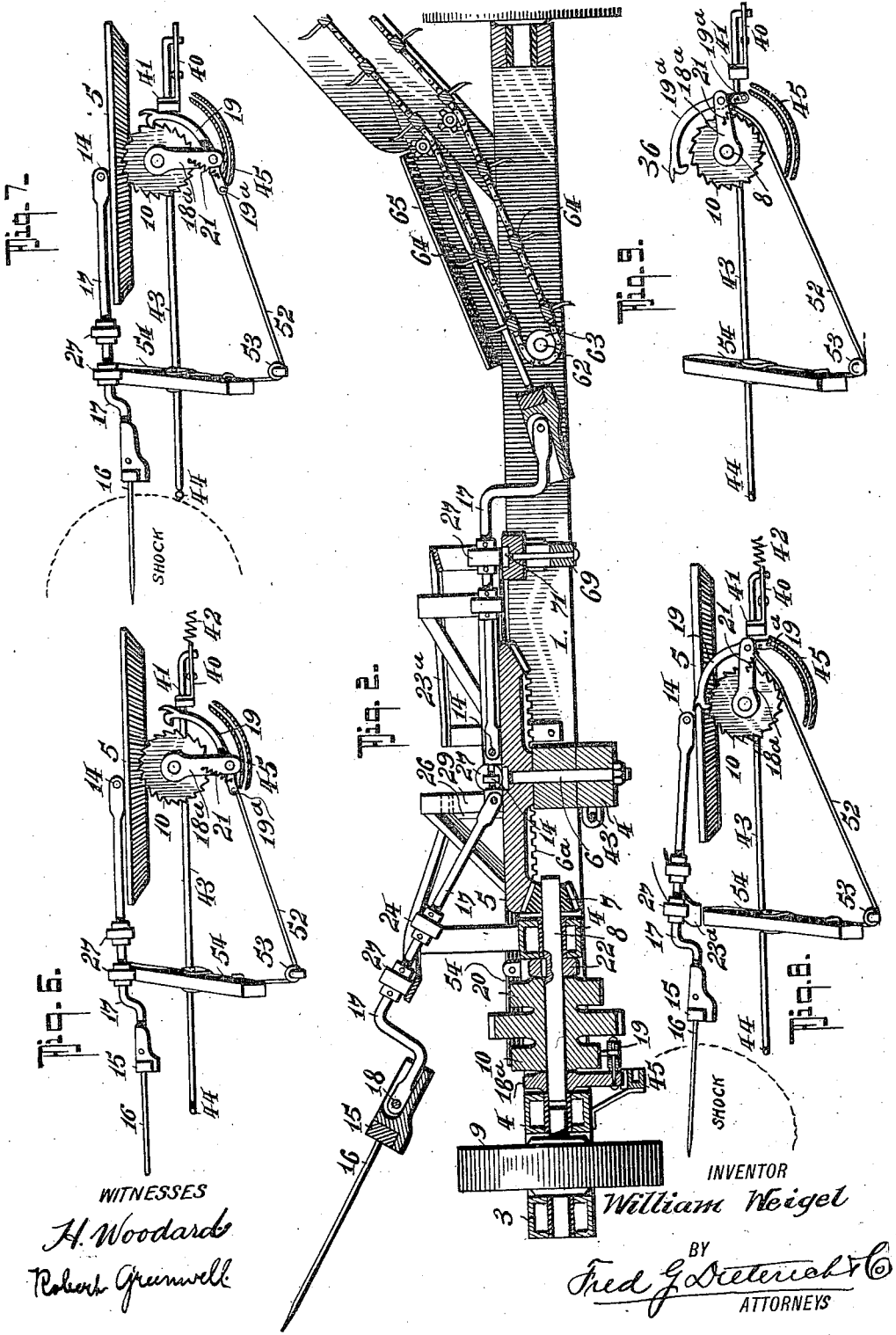

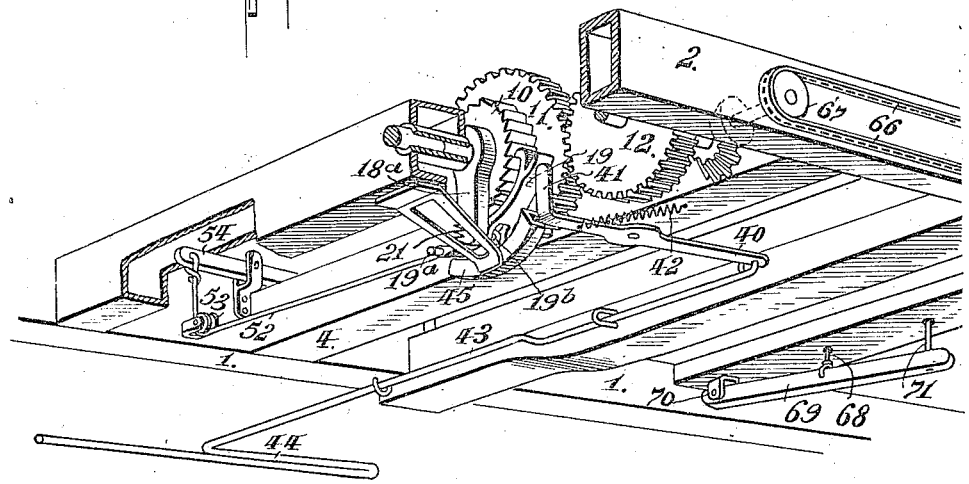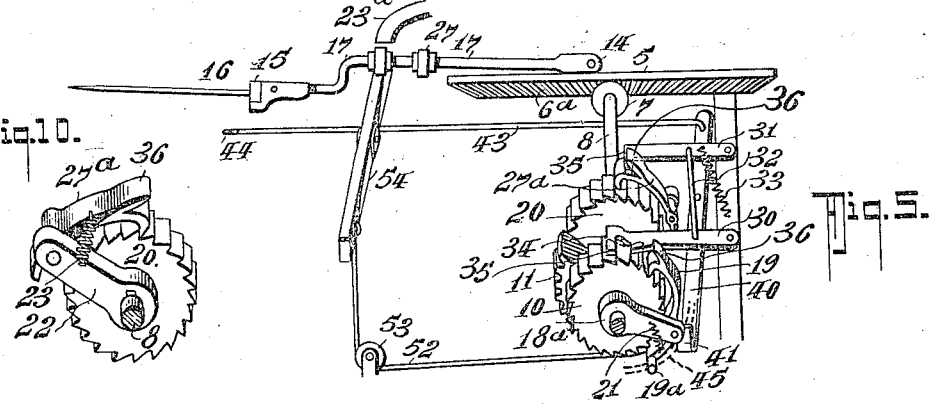

WILLIAM WEIGEL, OF FLANDREAU, SOUTH DAKOTA.

SHOCK-LOADER.

1,086,005.  Specification of Letters Patent.  Patented Feb. 3, 1914.

Application filed January 3, 1913. Serial No. 739,969.

*To all whom it may concern:*

Be it known that I, WILLIAM WEIGEL, residing at Flandreau, in the county of Moody and State of South Dakota, have invented a new and Improved Shock-Loader, of which the following is a specification.

My invention which relates to improvements in harvesting machinery generally, more particularly has reference to shock loading machines, of that type in which the shock gathering elements are pushed into the shock and caused to engage the shock in such manner that it is delivered onto suitable conveying means that delivers the gathered shock into a wagon or deposits it at the desired point.

The primary object of my invention is to provide a shock loading machine of the general type referred to of a simple and inexpensive construction, and in which the parts are especially designed for gathering and loading a new shock as a prior gathered shock is being discharged from the machine.

Another object of my invention is to provide certain improvements in shock loaders of the type stated in which the parts are so arranged that the operation of setting into action the shock delivering means is automatically effected as a gathering means is pushed into engagement with the shock to be loaded; a suitable number of the said gathering means being provided whereby the operation of gathering a new shock and delivering a gathered shock is simultaneous, and the coöperation of several connected mechanisms is such that they present a compact easily controlled and efficient means for the purposes stated.

With other objects in view that will hereinafter appear my invention embodies the novel features of construction and peculiar combination of parts all of which will be hereinafter explained, specifically set out in the appended claims and illustrated in the accompanying drawings, in which:—

Figure 1 is a top plan view of my invention. Fig. 2 is a vertical longitudinal section thereof, taken substantially on the line 2—2 on Fig. 1. Fig. 3 is a detail perspective view, parts being in section, of the power transmitting means and the automatically controlled clutch devices hereinafter referred to. Fig. 4 is a detail perspective view of one of the shock engaging forks, and Figs. 5, 6, 7, 8 and 9 are diagrammatic views that illustrate the different adjustments of the clutch devices that coöperate with the ratchet drive and hereinafter more specifically explained. Fig. 10 is a detail perspective view of one of the ratchet and pawl devices.

In the practical embodiment of my invention the same includes a main frame composed of front and rear longitudinal beams 1—2, preferably square tubing, and braced by an end cross member 3 and intermediate tubular cross beams 4.

5 designates a master wheel supported by and horizontally rotatable upon one of the cross beams 4, and held thereon by a king bolt 6. Wheel 5 has a bevel gear $6^a$ that meshes with a bevel drive pinion 7 on the inner end of a shaft or axle 8, a ground wheel 9, at the adjacent end of the supporting frame, is loosely mounted in horizontal alinement with the said shaft, it being mounted in the end cross member 3 and an adjacent cross beam 4.

10—20 designate two ratchet disks fixedly connected to or integral with a driven gear 11, the said combined gear and disks are loosely mounted on the shaft 8 as is best shown in Fig. 2, and the said gear 11 meshes with a gear 12 on a shaft $12^b$ mounted on the frame as best shown in Fig. 1 and said gear 12 is driven by a pinion 13 on engine shaft $13^a$.

By referring more particularly to Fig. 1, it will be seen that I have provided four forks or shock penetrators, disposed at right angles to each other, and individually hinged to the master wheel as at 14. Each fork consists of a head bar 15 from which the tines 16 of the forks extend, and an inwardly extended lever arm 17, that is hinged at the inner end to the master wheel 5, so it, with the fork head, may swing in the vertical plane. The fork head is hingedly joined to the outer end of the arm 17 for vertical swing independent of the said arm, the reason for which will presently appear, the hinge connection 18 for the arm 17 and the fork being, however, such that the fork does not drop in a plane below that of the arm 17 during the different adjustments thereof. At this point it should be stated, my mechanism includes means for automatically effecting a vertical lift of the fork after it has penetrated the shock whereby to put the said fork in position for being moved into engagement with a supporting guide, that holds the said fork with its shock load in proper position for being automatically conveyed to the point where the shock is dropped onto the offtake or discharging means and onto a guideway which, as the fork continues on its return movement, lifts the fork high enough to clear the heads of the horses that push the machine and then lowers the said fork into its first position ready to penetrate a new shock. For effecting the desired operations of the forks, I have provided an improved arrangement of intermittently operating drive mechanism served from the motor drive, and the said drive mechanism is best shown in Figs. 3 and 5.

18ª designates a crank arm loosely mounted on the shaft 8 on which is pivotally mounted a pawl 19, for engaging the ratchet disk 10, and normally held out of engagement by a spring 21.

22 designates a crank member fixedly connected to the shaft 8, carrying a pawl 27ª, arranged for engaging with the ratchet 20, toward which it is normally directed by a spring 23, see Fig. 10.

The two disks 10 and 20 and their driving means are so timed and relatively are so operated that the operation of lifting the fork that penetrates the shock is effected immediately after the shock is engaged, and the master wheel rotation is produced for swinging the loaded fork around to the delivery point which is begun just before the clutch or pawl 19 is released from its ratchet wheel, the operation being first to lift the fork, then swing around the filled fork as another fork is being moved into a shock engaging position.

23ª denotes a segmental guide which is in an elevated plane relatively to the master wheel, and the said guide supports the loaded fork as it is swinging from the first position around to the second position for coacting with the shock takeoff means presently referred to.

24 designates another segmental guide and support, concentric with the master wheel and which includes an incline 25 on which the fork lever 17 drops when the fork reaches its second position.

Guide 24 extends around to where the lever arm 17 of the forks assume their first or penetrating position and it stops at a vertical post 26, a plurality of similar posts 29 being mounted on and movable with the master wheel 5 and against which the roller bearings 27 on the lever arm 17 travel as the said lever is raised.

Referring again to Fig. 5, 30—31 designate a pair of laterally swingable tripper arms, connected by a rod 32 to cause the arms to move together and normally swing in one direction by the tension of a spring 33. Tripper arm 30 has a beveled edge 34, normally in the path of movement of the pawl 19, whereby when the said pawl is held in engagement with the ratchet 10, it engages the said beveled edge 34 and thereby gradually swings the arms 30 and 31 over, and since the arms 30 and 31 include fingers 35—35 that normally extend over the ratchets 10—20 for holding their coacting pawls 27ª and 19 lifted out of engagement with the ratchets, it follows that at a predetermined time, the finger 35 on tripper arm 31 moves from under lip 36 on pawl 27ª and permits spring 23 to hold pawl 27ª in engagement with ratchet 20.

So far as described, the transmission means operate as follows:—As the shock is engaged, the lever 40 moves the pawl 19 to engage the ratchet 10, and when the said pawl and ratchet 10 have just about completed their function, that of having lifted the fork arm 17 high enough to swing onto the guideway 23ª, the pawl 27ª and its ratchet 20, and the crank that coacts with the said ratchet 20, rotates shaft 8 and imparts rotary motion to the master wheel, to the extent of a quarter turn thereof, since the timing of the action of the pawl 27ª is such that the tripping finger 35 engages and lifts pawl 27ª out of engagement with the ratchet 20 at each quarter turn of the master wheel.

The manner in which the pawl devices are consecutively operated and timed to perform the functions stated is best explained as follows:—A rocking lever 40 is fulcrumed on the under side of one of the cross beams 4 and it includes an upturned member 41 for engaging the free end of the pawl 19, it being normally held from the said pawl by a spring 42.

43 is a slide rod that connects to the free end of the lever 40 and has its front end projected under the tines of the fork device, located at the front or penetrating side of the machine, and its front end is bent transversely to form an abutting or head portion 44. By reason of the arrangement of the slide rod connection and the lever connection with the pawl 19 it follows that when the fork is at its proper position, as shown in Fig. 1, the correlation of pawl 19 and the disk 10 is as shown in Fig. 6, the fork being now down and at the shock penetrating position. When the fork is pushed into the shock, the head portion 44 engages the shock and it consequently forces rod 43 back in the direction of the arrow and thereby rocks the lever 40 and forces its end against the pawl 19, causing it to engage the ratchet on the shaft, the said parts being now in the position shown in Fig. 7, by reference to which it will also be seen that as the pawl 19 is swung against ratchet 10 a lug 19ª on the said pawl engages a segmental keeper 45 to positively hold the pawl 19 locked with the disk 10, to that extent of time necessary to effect the lifting of the fork and putting it in position to engage the initial segmental support 23ª therefor.

A simple, efficient, and quickly actuated means for lifting the fork is diagrammatically shown in Figs. 3, 4, 5 and 6, in which 52 indicates a flexible pull rod or chain, one end of which is connected at 19ᵇ on the pawl 19.

The pull member 52 passes under a guide pulley 53 and connects with one end of a tiltable lever 54, best shown in the several diagrammatic views, and whose free end normally lies under the arm 17 that carries the front fork, it being obvious, by reason of the peculiar manner in which the several parts are combined, that as disk 10 with pawl moves, the pull member is pulled around with the pawl rocking lever that raises the fork; it being understood, pawl 27ª for the other disk 20 moves into operative engagement with the said disk 20 just before the lug 19ª of pawl 19 moves out of the segmental guide, and so soon as it does, lip 36 on pawl 19 comes in contact with finger 35 on tripper arm 30 and lifts pawl 19 out of engagement with ratchet 10; pawl 19 is held out of engagement with ratchet 10 by spring 21 and thereby permits the said arm and the pawl 19 to hang free and loosely from the said shaft 8 during the subsequent operation through the pawl 27ª and rack 20, of the master wheel to bring the fork to the unloading position.

After a fork is loaded, it is swung around at right angles to the line of shock penetration, at which time another fork will occupy the place of the former, its successive advance of position being accomplished by the following means; at the time when one fork at the shock penetration position is raised to ride upon the guide 23ª the fork in advance will also be raised, a flexible connection 68 being joined with lever 54 and a similar lever 69 pivoted at 70, the opposite end of which carries a plunger 71, the function of which is to raise the advanced fork to clear the conveyer teeth and aline the roller bearing 27 with the first portion of guide 24, see Figs. 1 and 2. When dropped to the second position the head 15, by reason of its hinged connection with the arm 17, rests on an endless carrier, that consists of sprocket chains 61 driven from a drive shaft 62 located in the side beams and which carry sprockets 63 for receiving the lower ends of the endless bands or belts, to which the conveyer or cross slats 64 are secured, the latter having prongs for projecting up through the tines of the fork.

65—65 indicate shields at the lower ends of the elevator for guiding the lower edge of the shock portions as they are combed off the fork and for covering the sprocket connections.

The operation of the endless conveyer is continuous and it receives motion through an endless drive 66 that engages a sprocket wheel 67 on a stub shaft mounted in the framing and which has a bevel pinion for engaging a like bevel drive gear on the shaft 12ᵇ of the gear 12.

From the foregoing description taken with the drawings the complete construction, the method of the operation and the advantages of my invention will be readily apparent to those skilled in the art.

The means shown and described present a practical embodiment of the essential features of my invention, but I wish it understood that the details and specific construction of the parts may be readily modified and varied without departing from my invention and the scope of the appended claims.

A loosely mounted colter 72 may be positioned on the tongue of my machine operable by a handle 73 as shown in Fig. 1, by which means the travel of the machine may be guided.

What I claim is:—

1. A shock loading machine comprising a portable frame, a plurality of independently operating shock gatherers, each including a fork for penetrating the shock, and means set into action as the fork penetrates the shock for first elevating the loaded fork and then moving it to a point of delivery, and simultaneously moving another of the said forks into a shock engaging position.

2. A shock loading machine comprising a portable frame, a plurality of independently operating shock gatherers, each including a fork for penetrating the shock, and means set into action as the fork penetrates the shock for first elevating the loaded fork and then moving it to a point of delivery, the said means including power transmission mechanism timed for moving one of the shock gatherers into a shock engaging position as the loaded gatherer is moved to the point of delivery.

3. In a shock loading machine a shock gatherer which includes a fork for penetrating the shock, and means set into action as the said fork penetrates the shock for elevating the gatherer, and then swinging it to a point of delivery, and an endless conveyer mechanism including pronged slats whose receiving end is located relatively to the delivery position of the fork so the prongs of the slats pass between the tines of the fork to clear the fork of the load.

4. In a shock loading machine, a portable frame having draft devices for pushing the machine to the shock, a motor carried on the frame, a plurality of independently operating shock gatherers, each including a forked head for penetrating the shock, and each being swingable in a circular path, means actuated by the motor for first elevating the loaded gatherer and then swinging it and the other gatherers around while bringing the gathered shock to a point of discharge, means for clearing the loaded fork when it reaches the point of discharge, and timing devices actuated as either of the forks penetrate the shock for controlling the operation of the power transmitting devices by virtue of which a loaded fork is first elevated and then with the other forks is swung around.

5. In a shock loading machine, a portable frame having draft devices for pushing the machine to the shock, a motor carried on the frame, a plurality of independently operating shock gatherers, each including a forked head for penetrating the shock, and each being swingable in a circular path, means actuated by the motor for first elevating the loaded gatherer and then swinging it and the other gatherers around while bringing the gathered shock to a point of discharge, means for clearing the loaded fork when it reaches the point of discharge, and timing devices actuated as either of the forks penetrate the shock for controlling the operation of the power transmitting devices by virtue of which a loaded fork is first elevated and then with the other forks is swung around, and other means for raising each of the forks as they are returned to their first position high enough to pass above the heads of the horses pushing the machine.

6. In a shock gathering machine that includes a portable carrier frame and draft means for pushing it toward a shock; a plurality of shock gatherers each including a forked head; a horizontally disposed master drive gear to which each gatherer is hingedly connected to swing in the vertical plane, a motor, power transmission connecting the motor and the master wheel, means for lifting the gatherers with the load, said power transmission including devices set in action as the gatherer forks penetrate the shock for actuating the lifting devices to elevate the loaded gatherer, and other devices for imparting rotary motion to the master wheel immediately after the loaded gatherer is elevated.

7. In a shock gathering machine that includes a portable carrier frame and draft means for pushing it toward a shock; a plurality of shock gatherers each including a forked head; a horizontally disposed master drive gear to which each gatherer is hingedly connected to swing in the vertical plane, a motor, power transmission connecting the motor and the master wheel, means for lifting the gatherers with the load, said power transmission including devices set in action as the gatherer forks penetrate the shock for actuating the lifting devices to elevate the loaded gatherer, and other devices for imparting rotary motion to the master wheel immediately after the loaded gatherer is elevated, and guides concentric with the master wheel for supporting the gatherers as they are swung around, one of the guides extending from the loading point to the load discharging point.

8. In a shock loading machine of the character described; a horizontally disposed master wheel, and a conveying mechanism, a series of shock gatherers disposed at right angles to each other and each including an inwardly extended lever arm hingedly connected to the master wheel to swing in the vertical plane, and a forked head at the outer end, a motor drive power transmitting mechanism geared with the master wheel, said mechanism including shiftable clutch devices, means for elevating the loaded gatherer connected with and actuated at predetermined times by the transmitting mechanism, and other means including a pusher member that engages the shock as the forked head penetrates it, for controlling the clutch devices, whereby the power transmitting mechanism is automatically shifted for first operating the gatherer lifting means and then setting in motion the master wheel.

9. In a shock gathering machine of the character described, and including an elevated endless conveyer, and a master gear rotatable in the horizontal plane and located in advance of the conveyer; a gatherer that includes a lever arm hinged on and radially projected from the master wheel, and a forked head, the latter being joined to the arm to swing upwardly independent of the swing of the said arm, a motor drive mechanism connecting the motor and the wheel, said mechanism including clutch devices, a means for elevating the gatherer and its head at times, and clutch devices that coöperate with the said means operated by the penetration of the gatherer into the shock, whereby to shift the clutch devices to first throw into action the gatherer elevating means and then impart motion to the master wheel.

10. In a shock gathering mechanism of the character stated in which is included a rotatably and vertically swingable gatherer, having a forked head for penetrating the shock, a means for lifting the gatherers to elevate it with its load; a motor and a power transmitting mechanism, said mechanism including a shaft geared with the master wheel, a gear loosely mounted thereon and having two ratchet rims, a crank member fixedly connected to the shaft and carrying a clutch that normally engages one of the ratchet rims, a hanger loose on the shaft carrying a clutch for engaging the other ratchet rim and normally held out of engagement with the said rim, said latch clutch being connected with the gatherers elevating means and adapted for actuating said means to lift the loaded gatherers when it is moved into engagement with its co-acting clutch rim, a shiftable device including a head for engaging the shock and arranged when engaging a shock to move the open clutch into engagement with its ratchet rim, means for holding the said clutch to its rim engaging position for a predetermined time, and trip devices actuated by the clutch that is pushed into engagement with its ratchet rim for holding the clutch that engages the other ratchet rim of the gear, whereby to throw out the master wheel actuating shaft while the loaded gatherer is being elevated.

11. In a shock loading machine in which is included a portable frame and a conveyer that receives the gathered shock, a plurality of independently operating shock gatherers each including a fork for penetrating the shock, means set into action as the fork penetrates the shock after first elevating the loaded fork and then moving it to a point of delivery, and other means for elevating a preceding fork to cause it to clear the conveyer.

12. In a shock loading machine comprising a portable frame, a conveyer that receives the gathered shock, a plurality of independently operating shock gatherers each including a fork for penetrating the shock, means set into action as the fork penetrates the shock after first elevating the loaded fork and then moving it to a point of delivery, and other means for elevating a preceding fork to cause it to clear the conveyer, the said other means including a vertically movable plunger and coöperating devices connecting the plunger and the driving mechanism for raising the plunger at predetermined times.

WILLIAM WEIGEL.

Witnesses:
 ROBERT JOHNSTON,
 IRA F. BLEWITT.